March 6, 1956 C. V. GIAIMO 2,737,183
ELECTRICAL CONTROL OF PARTIALLY DENERVATED MUSCLES
Filed June 11, 1951
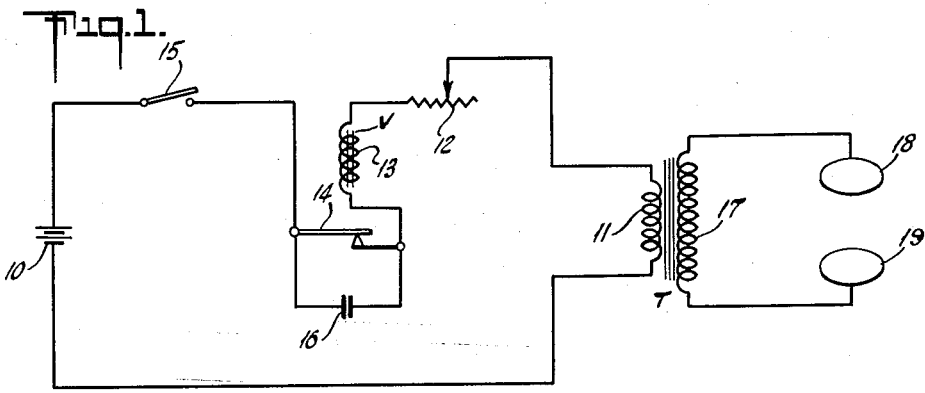
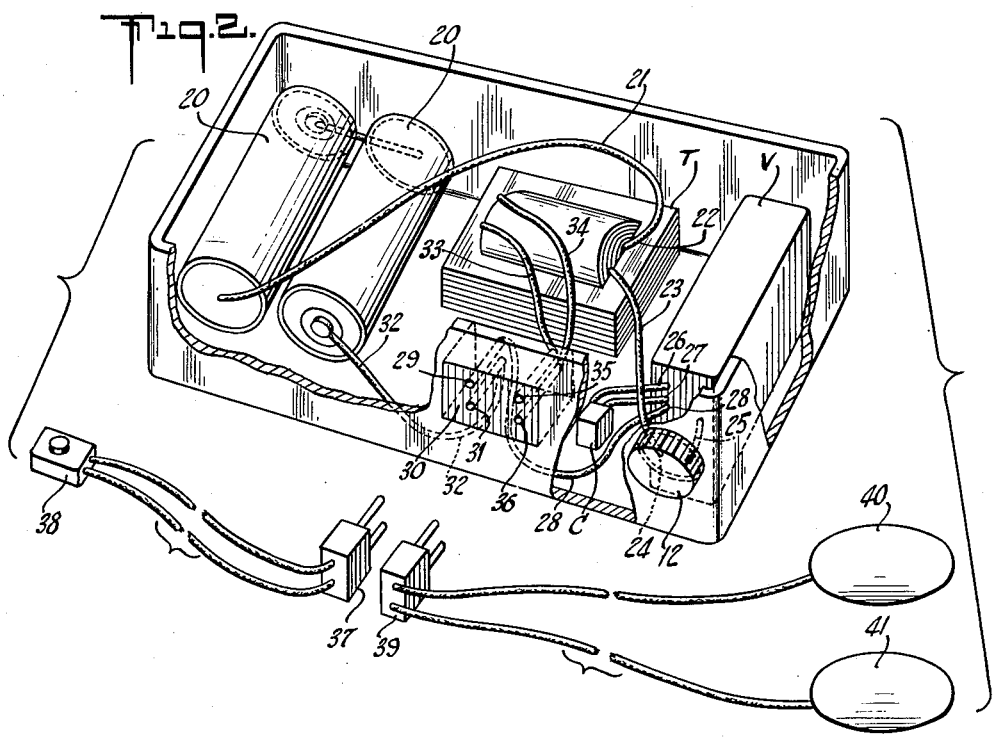
INVENTOR.
CHARLES GIAIMO
BY John M. Cole
ATTORNEY.

United States Patent Office 2,737,183
Patented Mar. 6, 1956

2,737,183
ELECTRICAL CONTROL OF PARTIALLY DENERVATED MUSCLES

Charles Vincent Giaimo, Madison, N. J., assignor to The Lionel Corporation, New York, N. Y., a corporation of New York Application June 11, 1951, Serial No. 231,029

1 Claim. (Cl. 128—424)

The present invention relates to electrical control of partially denervated muscles.

The functioning of muscles is normally under electrical control through the nerves in accordance with the stimuli impressed on the nerve circuit. Where the nerve to a motor muscle is severed or completely dead, no impulse is received by the muscle, and progressive changes take place in the muscle so that it no longer can function as a muscle. In cases where the impairment of the nerve has been partial, rather than complete, the transmission of an effective electrical impulse from a natural stimulus does not take place and the muscle is called partially denervated.

Partially denervated muscles may exist in various parts of the body and each impairs a particular activity. As one muscular activity is interrelated to many others in carrying out a completed action, the affected individual cannot use muscles which have normal nerve control. For example, ordinary walking involves a complex series of bone movements about the hip joints, the knees and the ankles, and if one of these essential movements cannot be completed, the others do not follow in proper sequence.

According to the present invention, the partially denervated muscle is subjected to an electrical stimulus of suitable voltage and duration and at the will of the individual so that the muscle can be activated and perform its proper function. The electrical apparatus provided for the purpose is, according to the present invention, light in weight, compact, dry cell battery energized, and capable of being carried in the pocket or otherwise, with little if any inconvenience. It uses a small amount of energy so that the dry cells have a long life.

The accompanying drawings show, for purposes of illustrating the present invention, one embodiment in which the invention may take form, it being understood that the drawings are illustrative of the invention rather than limiting the same.

In the accompanying drawings:

Figure 1 is a wiring diagram;

Figure 2 is a view illustrating a convenient assemblage of the electrical components; and Figure 3 illustrates a typical application of the apparatus to the body for controlling a partially denervated muscle.

The wiring diagram for the device is shown in Figure 1.

The device is energized by a small two-cell dry battery 10 with an output of about three volts. The circuit from this battery includes the primary coil 11 of a step-up transformer T, a variable resistance 12, the coil 13 of a vibrator V having an armature 14, and a switch 15. These parts are connected by suitable wires as shown in the drawing and the vibrator contact is shunted by a condenser 16. The vibrator is adjusted to produce unidirectional impulses of direct current. The frequency is in the order of hundreds of cycles, the optimum being about 200 pulses per second. The amplitude of the pulses is controlled by the variable resistance 12. The current in the battery circuit is preferably approximately ¼ ampere maximum. The transformer T is a close coupled transformer with an output in the order of hundreds of volts, the optimum being about 250 volts. Such a transformer has a ratio of about 1 to 20. The secondary coil is shown at 17 and the electrodes at 18 and 19. The pulse generator has a relatively low impedance which the transformer matches to the relatively high impedance of the body so as to secure maximum effect.

As shown in Figure 2, the dry cells 20, 20 forming the battery 10 are connected by wire 21 with one of the terminals 22 of the primary coil of the transformer T. The other end of the primary coil is connected by wire 23 with the contact 24 with the variable resistance 12. This resistance is connected by wire 25 with the vibrator V. The condenser C is connected to the vibrator by wires indicated at 26 and 27. The connection 28 extends from the vibrator to one of the contacts 29 of a receptacle 30. The other contact 31 of the receptacle is connected by wire 32 with the battery 20. The secondary leads from the transformer T are indicated at 33 and 34. These extend to receptacle contacts 35 and 36. The battery, transformer, vibrator, rheostat, wiring and receptacles are assembled in a small compact box-like container suitable for being carried in the pocket. Such a container may, for example, be 5" to 6" long, 2½" to 3" wide, and 1½" to 2" deep.

The two-conductor plug 37 connects the contacts 29 and 31 with a switch 38. This switch may be a manually operable switch or one energized by some body movement, as for example a mercury switch responsive to a tilting action, or other form of switch. A similar, but not interchangeable, plug 39 cooperates with the receptacle contacts 35 and 36 and is connected to the electrodes 40, 41. The place where one of the electrodes is applied to the body depends upon the muscle requiring electrical stimulation. For each motor muscle there is a special spot. If, for example, the muscle involved is the one which pushes the lower leg forward after the foot has been raised off the ground, the electrode will be placed opposite the nerve center for this muscle which is just below the knee on the under side of the leg. The other or return electrode may be placed anywhere convenient. A conducting ointment is usually employed on the electrode.

The individual who has such an impaired muscle can then at the proper time energize the device by closing the switch 38 so that the muscle necessary to swing the lower leg forward will function and place the foot far enough forward so that it can be lowered to the ground to take the necessary step. The positioning of the parts for this purpose is illustrated in Figure 3.

It will be seen from the foregoing that the present invention provides a portable apparatus which one can carry about on the person and by which, at the will of the user, the affected muscle may bee nergized to accomplish a normal function and coordinate the action of the partially denervated muscle with the other related muscles of the body. The device is also useful in the massage and exercising of muscles, for example, to relax overworked muscles.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

An activator for the partially denervated muscle of a person adapted to be carried about by the person; comprising a generator in the form of a preassembled unit and including both a normally open, series, primary circuit including a battery, an electromagnetic vibrator, a current limiting resistance, the primary coil of a step-up transformer, and two primary circuit terminals; and a normally open secondary circuit including the secondary coil of the transformer and secondary output terminals; a primary circuit control switch with leads connected to the primary circuit terminals and adapted to be so located that it may be closed in response to a voluntary bodily movement; and electrodes connected to the secondary output terminals and adapted to be positioned on the body in a pre-selected position to complete the secondary circuit and effect muscle activation.

References Cited in the file of this patent

UNITED STATES PATENTS

| | | |
|---|---|---|
| 305,894 | Clarke | Sept. 30, 1884 |
| 423,617 | Manker et al. | Mar. 18, 1890 |
| 651,777 | Brown | June 12, 1900 |
| 1,323,472 | Herdman | Dec. 2, 1919 |
| 2,498,882 | Fizzell et al. | Feb. 28, 1950 |
| 2,590,216 | Schuhfried | Mar. 25, 1952 |

OTHER REFERENCES

Handbook of Electro-Therapeutics, published in 1883 by William Wood and Co., New York, N. Y., p. 128. Copy in Division 55.

The Journal of Bone and Joint Surgery for January 1947, pp. 241–246. Copy in Scientific Library.